United States Patent
Kline et al.

(10) Patent No.: US 11,255,763 B2
(45) Date of Patent: Feb. 22, 2022

(54) SYSTEM FOR IDENTIFYING PARTS FORMED IN AN ADDITIVE MANUFACTURING BUILD

(71) Applicant: Hexcel Corporation, Stamford, CT (US)

(72) Inventors: Whitney Kline, Ellington, CT (US); Alden Winn, Glastonbury, CT (US)

(73) Assignee: Hexcel Corporation, Stamford, CT (US)

( * ) Notice: Subject to any disclaimer, the term of this patent is extended or adjusted under 35 U.S.C. 154(b) by 246 days.

(21) Appl. No.: 16/682,762

(22) Filed: Nov. 13, 2019

(65) Prior Publication Data

US 2021/0140860 A1 May 13, 2021

(51) Int. Cl.
| | |
|---|---|
| *G01N 3/08* | (2006.01) |
| *B29C 64/153* | (2017.01) |
| *B29L 31/40* | (2006.01) |
| *G06K 19/06* | (2006.01) |
| *G01N 3/02* | (2006.01) |
| *G06K 1/12* | (2006.01) |

(Continued)

(52) U.S. Cl.
CPC .............. *G01N 3/08* (2013.01); *B29C 64/153* (2017.08); *B29C 64/393* (2017.08); *B29L 2031/40* (2013.01); *B33Y 70/00* (2014.12); *B33Y 80/00* (2014.12); *G01N 3/02* (2013.01); *G01N 2203/027* (2013.01); *G01N 2203/0268* (2013.01); *G01N 2203/0298* (2013.01); *G06K 1/126* (2013.01); *G06K 19/06* (2013.01); *G06K 19/06009* (2013.01); *G06K 19/06028* (2013.01); *G06K 19/06046* (2013.01); *G06K 19/06075* (2013.01); *G06K 19/06121* (2013.01); *G06K 2019/06253* (2013.01); *G06K 2019/06271* (2013.01)

(58) Field of Classification Search
CPC ...... B29C 64/153; B29C 64/393; G01N 3/08; G01N 3/02; G01N 2203/0298; G01N 2203/0268; G01N 2203/027; B29L 2031/40; B33Y 80/00; B33Y 70/00; G06K 19/06; G06K 19/06009; G06K 19/06028; G06K 19/06037; G06K 19/06121; G06K 19/06046; G06K 19/06075; G06K 2019/06253; G06K 2019/06271; G06K 1/126
See application file for complete search history.

(56) References Cited

U.S. PATENT DOCUMENTS

| | | | | |
|---|---|---|---|---|
| 4,749,847 | A * | 6/1988 | Despres | .................... G09F 3/00 235/487 |
| 6,877,668 | B1 * | 4/2005 | Kitagawa | .............. H01L 23/544 235/494 |

(Continued)

*Primary Examiner* — Jonathan M Dunlap
(74) *Attorney, Agent, or Firm* — Welsh IP Law LLC (57) ABSTRACT

A system and method for identifying test bars formed during a selective laser sintering build. A part cake is formed during a selective laser sintering build. The part cake comprises parts formed from a powder by selective laser sintering and unsintered powder around the formed parts. The parts include test bars for performing material testing. Each test bar includes a plurality of indentations in a first grip section and a second grip section. The plurality of indentations are arranged in an information providing pattern that is adapted to be readable after the test part is removed from the part cake.

32 Claims, 6 Drawing Sheets

(51) Int. Cl.
*B29C 64/393* (2017.01)
*B33Y 80/00* (2015.01)
*B33Y 70/00* (2020.01)

(56) References Cited

U.S. PATENT DOCUMENTS

| | | | |
|---|---|---|---|
| 10,342,664 B2* | 7/2019 | Kieser | A61F 2/442 |
| 2002/0084329 A1* | 7/2002 | Kaye | G06K 19/06009 |
| | | | 235/462.01 |
| 2011/0052927 A1* | 3/2011 | Martinoni | C08G 69/14 |
| | | | 428/474.7 |
| 2015/0328665 A1 | 11/2015 | DeFelice et al. | |
| 2016/0042261 A1* | 2/2016 | Kieser | G06K 19/06121 |
| | | | 235/489 |
| 2016/0304677 A1* | 10/2016 | Evans | B05D 3/002 |
| 2018/0085186 A1* | 3/2018 | Kieser | A61B 90/94 |
| 2018/0200922 A1 | 7/2018 | DeFelice et al. | |
| 2018/0200960 A1 | 7/2018 | DeFelice et al. | |
| 2018/0201783 A1 | 7/2018 | DeFelice et al. | |

\* cited by examiner

SYSTEM FOR IDENTIFYING PARTS FORMED IN AN ADDITIVE MANUFACTURING BUILD

TECHNICAL FIELD

The present disclosure generally relates to additive manufacturing technology and techniques, and more specifically relates to a system and method for identifying parts formed during in an additive manufacturing build. More specifically, the present invention relates to a system and method for identifying test coupons printed from polymer powders during a selective laser sintering build.

BACKGROUND

It is known to use additive manufacturing technology and techniques, together with polymer powders, to manufacture high-performance products having applications in various industries (e.g., aerospace, industrial, medical, etc.).

Selective laser sintering ("SLS") is an additive manufacturing technique that uses a laser to fuse small particles of plastic, metal (direct metal laser sintering), ceramic, or glass powders into a mass having a desired three-dimensional (3-D) shape. The laser selectively fuses the powder material by scanning cross-sectional layers generated from a 3-D digital description of the desired object onto the top layer of a bed of the powder material. After a cross-sectional layer is scanned, the powder bed is lowered by one-layer thickness in a z-axis direction, a new top layer of powder material is applied to the powder bed, and the powder bed is rescanned. This process is repeated until the object is completed. When completed, the object is formed in a "cake" of unfused powder material. The formed object is extracted from the cake. The powder material from the cake can be recovered, sieved, and used in a subsequent SLS process.

Polyaryletherketones ("PAEK") are of interest in the SLS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKEKK").

PEKK powders are of particular interest in the SLS process because objects that have been manufactured from PEKK powders via SLS have demonstrated not only the above characteristics but also superior strength relative to other PAEK materials.

During a SLS build a plurality of test coupons are formed in the part cake by SLS. In some builds, for example, the part cake may include five or more test coupons that extend in the z-direction and five or more test coupons that extend in a plane perpendicular to the z-direction. After the build, the test coupons are removed from the part cake and subjected to tensile testing. The test coupons may include numbers for identification purposes. In some cases, qualification protocols require that a number is affixed to the test coupon for the purposes of identifying the test coupon after it is removed from the part cake.

Figure 5:
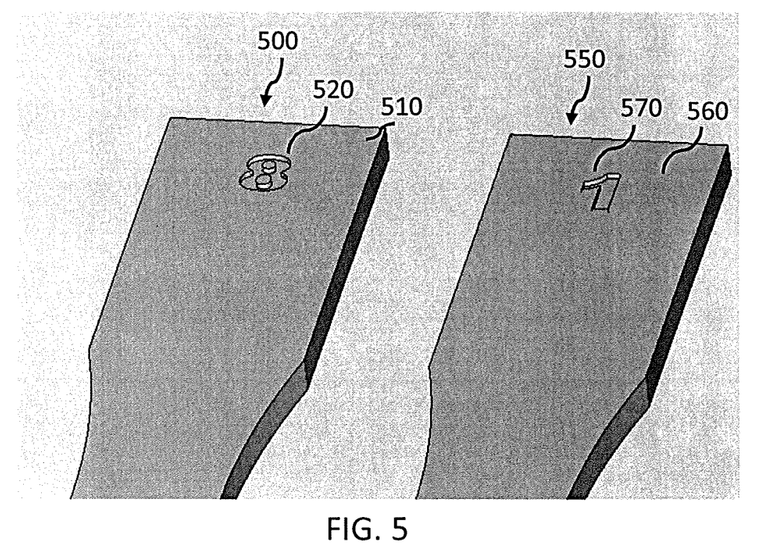
FIG. 5 is a perspective view of a portion of a test coupon.
Figure 6:
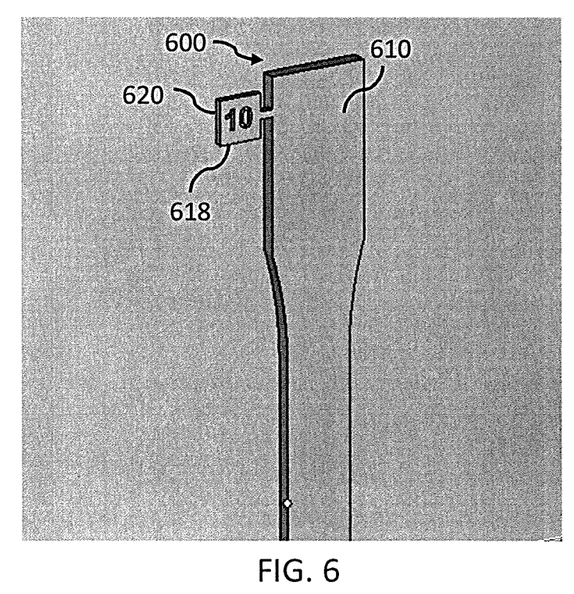
FIG. 6 is a perspective view of a portion of a test coupon.

In reference to FIGS. 5 and 6, two examples of methods of identifying test coupons are shown. In reference to FIG. 5, the ends of two test coupons 500, 550 are shown. The grip section 510, 560 of each test coupon 500, 550 includes a recessed number formed in a surface thereof. A disadvantage of forming identification numbers in this manner is that it creates areas of stress concentration when the test coupons are subject to tensile testing. For example, when the coupon is subject to testing during ASTM D638 testing protocol the recessed numbers lead to stress concentrations around the recessed numbers in the grip section of the test coupon. The unwanted stress concentrations lead to increased incidence of failure of test specimens at the grip sections during tensile testing. Such failures mean the test specimen cannot be used for tensile testing. In some cases, the number of failures in a particular build may result in insufficient test specimens for qualification of the build, resulting in the entire build being unusable. This can result in significant costs considering that it takes up to 96 hours to perform a build and considering that material cost for the build can be significant.

In reference to FIG. 6, a different method of identifying the test coupon is shown. The test coupon 600 includes a first grip section 660. A tab 670 extends from a side of the first grip section and includes a number 620 printed in a face thereof. A disadvantage of this method is that it results in an undesirable stress concentration in a side surface of the first grip section which can lead to unwanted failure at this section. Another disadvantage of this method is that is significantly increases the build time for the part cake. Another disadvantage of this method is that it significantly reduces the available space for parts. Another disadvantage of this method is that it reduces the amount of powder in the build that is available for recycle, or for use in subsequent SLS builds.

Thus, there exists a need in the art for an improved selective laser sintering method which utilizes an improved method for identifying test coupons formed during the selective laser sintering method.

SUMMARY OF THE INVENTION

The needs set forth herein as well as further and other needs and advantages are addressed by the present teachings, which illustrate solutions and advantages described below.

It is an objective of the present teachings to remedy the above drawbacks and issues associated with prior art selective laser sintering methods and powder compositions.

The present invention resides in one aspect in a system for identifying test bars formed during a selective laser sintering build. The system includes a part cake formed during a selective laser sintering build. The part cake comprises a plurality of parts formed from a powder by selective laser sintering and further comprises unsintered powder disposed around the formed parts. The plurality of parts comprise a plurality of test bars for performing material testing. Each test bar of the plurality of test bars extends along an axis between a first end and a second end. Each test bar of the plurality of test bars has a first grip section proximate to the first end and a second grip section proximate to the second end. Each test bar of the plurality of test bars further comprises a plurality of indentations in one or more of the first grip section and the second grip section. The plurality of indentations are arranged in a information providing pattern that is adapted to be readable after the test part is removed from the part cake.

In yet a further embodiment of the present invention the information providing pattern provides digital information.

In yet a further embodiment of the present invention, the information providing pattern on each test bar of the plurality of test bars provides a first identifier that is unique to the test bar on which the first identifier is arranged relative to the plurality of test bars.

In yet a further embodiment of the present invention, the information providing pattern comprises a binary sequence comprising one or more of an indentation and a space.

In yet a further embodiment of the present invention, each indentation comprises a notch in an edge of one or more of the first grip section and the second grip section.

In yet a further embodiment of the present invention, the edge is defined by an intersection between a first surface that extends in a plane parallel to the axis of the test bar and a sidewall that extends in a plane perpendicular to the plane in which the first surface extends.

In yet a further embodiment of the present invention, the edge is at one or more of the first end and the second end of the test bar.

In yet a further embodiment of the present invention, the edge is perpendicular to the axis of the test bar.

In yet a further embodiment of the present invention, the position of the information providing pattern on the test bar does not interfere with material testing performed on the test bar.

In yet a further embodiment of the present invention, the information providing pattern on each test bar of the plurality of test bars provides a second identifier that is distinct from the first identifier and that is unique to the test bar on which it is arranged relative to the plurality of test bars.

In yet a further embodiment of the present invention, the first identifier comprises notches having a first depth and the second identifier comprises notches having a second depth. The second depth is different than the first depth.

In yet a further embodiment of the present invention, each of the plurality of test bars conforms with requirements defined by ASTM D638 for Standard Test Method for Tensile Properties of Plastics.

In yet a further embodiment of the present invention, the plurality of test bars comprises at least five test bars extending in a z direction in the part cake and at least five test bars extending in a plane perpendicular to the z direction.

In yet a further embodiment of the present invention, the indentations are readable by an unaided human eye.

The present invention resides in yet another aspect in a test bar formed in a selective laser sintering build. The test bar includes a body extending along an axis from a first end to a second end. A first grip section is at the first end and a second grip section is at the second end. The test bar includes a front surface that extends in a plane between the first end and the second end and a rear surface that extends in a plane between the first end the second end. A side surface extends between the front surface and the rear surface. The test bar includes a plurality of indentations in one or more of the first grip section and the second grip section. The plurality of indentations are arranged in an information providing pattern that is adapted to be readable.

In yet a further embodiment of the present invention, each of the plurality of test bars conforms with requirements defined by ASTM D638 for Standard Test Method for Tensile Properties of Plastics.

In yet a further embodiment of the present invention, the information providing pattern comprises a binary sequence comprising one or more of an indentation and a space.

In yet a further embodiment of the present invention, the information providing pattern on each test bar provides a first identifier that is unique to the test bar on which it is arranged relative to a plurality of test bars formed during a laser sintering build in which the test bar was formed.

In yet a further embodiment of the present invention, the indentations comprise notches formed in an edge of the one or more of the first grip section and the second grip section.

In yet a further embodiment of the present invention, the edge is defined by an intersection between the side surface and one or more of the front surface and the rear surface.

In yet a further embodiment of the present invention, the edge is at one or more of the first end and the second end of the test bar and extends along an axis that is perpendicular to the axis of the test bar.

In yet a further embodiment of the present invention, the position of the information providing pattern on the test bar does not interfere with material testing performed using the test bar.

In yet a further embodiment of the present invention, the information providing pattern on each test bar provides a second identifier that is distinct from the first identifier and that is unique to the test bar on which it is arranged relative to the plurality of test bars formed during a laser sintering build in which the test bar was formed.

In yet a further embodiment of the present invention, the first identifier comprises notches having a first depth and the second identifier comprises notches having a second depth. The second depth is different than the first depth.

In yet a further embodiment of the present invention, the indentations are readable by an unaided human eye.

The present invention resides in yet another aspect in a method for encoding a unique identifier on a test bar formed in a cake bed during a selective laser sintering build. The method includes the step of providing an identifier. Next, the method includes the step of converting the identifier into a digital form. Next the method includes the step of building a test bar from a powder by selective laser sintering, the test bar comprising a body extending along an axis from a first end to a second end, a first grip section at the first end, a second grip section at the second end. The method next includes the step of forming a plurality of indentations via the selective laser sintering in one or more of the first grip section and the second grip section. The plurality of indentations are arranged in an information providing pattern that is adapted to be readable. The pattern may comprises a digital information providing pattern.

In yet a further embodiment of the present invention, the step of building the test bar comprises building a test bar that conforms with requirements defined by ASTM D638 for Standard Test Method for Tensile Properties of Plastics.

In yet a further embodiment of the present invention, the information providing pattern comprises a binary sequence comprising one or more of an indentation and a space.

In yet a further embodiment of the present invention, the identifier is unique to the test bar on which it is arranged relative to a plurality of test bars formed during the same selective laser sintering build.

In yet a further embodiment of the present invention, the indentations comprise notches formed in an edge of the one or more of the first grip section and the second grip section.

In yet a further embodiment of the present invention, the method further includes the step of testing the test bar in accordance with ASTM D638 for Standard Test Method for Tensile Properties of Plastics.

In yet a further embodiment of the present invention, the position of the information providing pattern on the test bar does not interfere with material testing.

In yet a further embodiment of the present invention, the method includes the step of decoding the information providing pattern to determine the identifier and further includes the step of associating the identifier with a result of the testing in a storage.

DETAILED DESCRIPTION

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

The present invention is especially useful for qualifying polymer powders and parts made therefrom during the selective laser sintering process. One such class of polymer powders is polyaryletherketones ("PAEK") polymers. PAEKs are of interest in the SLS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKEKK"). It will be understood to a person of ordinary skill in the art and familiar with this disclosure that although the present invention is disclosed in regard to selective laser sintering of PAEK polymers, and more specifically PEKK polymers, the present invention is not limited in this regard. The present invention may be employed with the selective laser sintering of other materials, including but not limited to, polymers such as polyamides (PA), polystyrenes (PS), thermoplastic elastomers (TPE). It will also be understood to a person of ordinary skill in the art that although the invention is described in reference to the additive manufacturing technique of selective laser sintering, a person of ordinary skill in the art and familiar with this invention may employ the disclosed method with other types of additive manufacturing.

Figure 2:
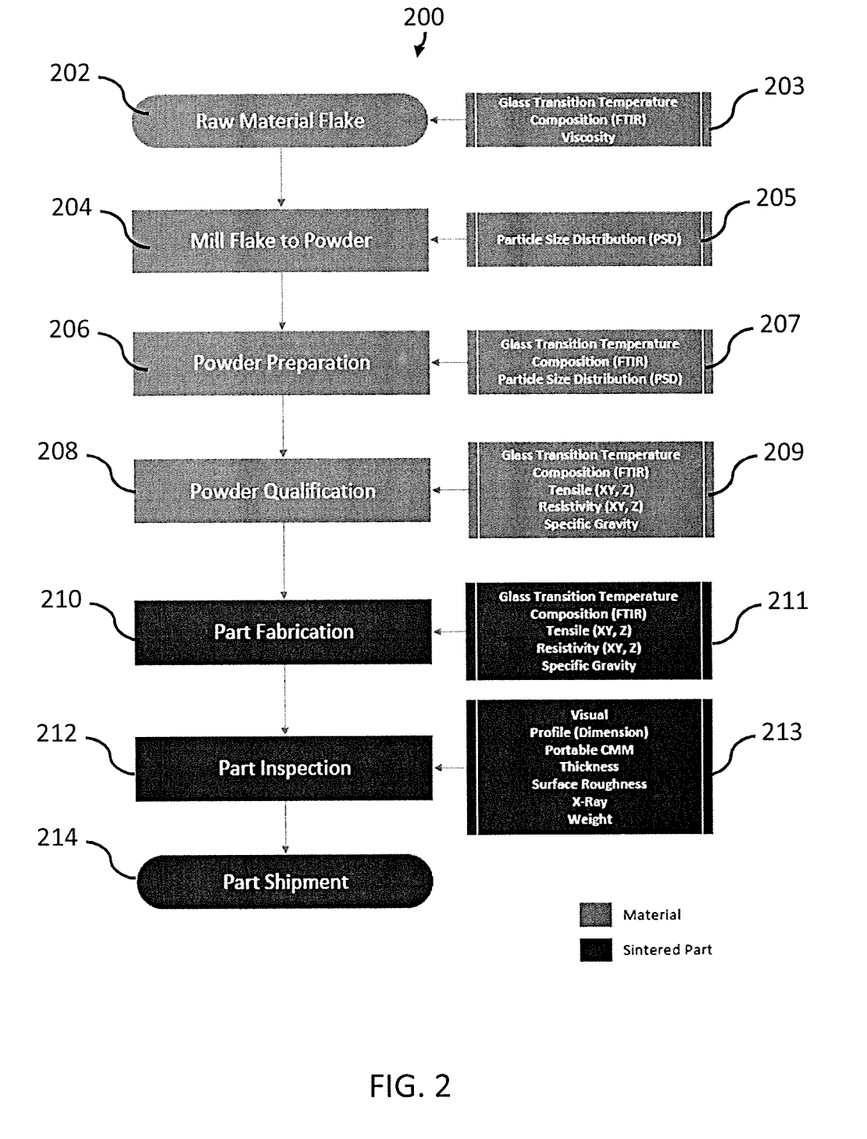
FIG. 2 is a chart illustrating steps in the SLS process and associated tests that may be performed on the powder or product during each step.

In reference to FIG. 2, a chart 200 showing steps 202, 204, 206, 208, 210, 212, 214 in one embodiment of an SLS process for PEKK is shown. Each step in the process 202, 204, 206, 208, 210, 212, 214 includes an opportunity to capture and record data indicative of one or more properties of the powder, the process, and the parts made therefrom. This data can be used to qualify the process, the powder, and parts made therefrom.

The first step 202 is to provide raw PEKK flake. Several tests 203 may be performed on the raw PEKK flake including determining the glass transition temperature via DSC, determining the composition via FTIR, and determining the viscosity. The test results may be stored in a data storage and associated with the powder lot on which they were performed. The raw PEKK flake is optionally subjected to a heat treatment step that is described in U.S. patent application Ser. No. 15/872,478 filed on Jan. 16, 2018 by Hexcel Corporation and titled "Polymer Powder and Method of Using the Same." The testing may occur before the heating, after the heating, or both before and after the heating.

In the next step, the raw PEKK flake is milled to form the PEKK powder for SLS 204. After the milling, an air classification method may be used to separate fine particles from the milled PEKK powder. The separation process is the subject of US Publication No. US20150328665 published on Nov. 19, 2015 by Hexcel Corporation and titled "Method For Preparing Fine Powders For Use In Selective Laser Sintering Processes." The disclosure of that publication is hereby incorporated by reference. The particle size distribution of the powder by particle count and by weight may be observed and recorded in a data storage and associated with the powder lot 205.

After the grinding step 204, another optional processing step 206 is performed that involves adding an amount of carbon fiber to the PEKK powder. The mixing process is the subject of US Publication No. US20180201783 published on Jul. 17, 2018 by Hexcel Corporation and titled "Polymer Powder and Method of Preparing the Same." The disclosure of that publication is hereby incorporated by reference. Several tests 207 may be performed on the resulting powder including determining the glass transition temperature via DSC, determining the composition via FTIR, and determining the viscosity. The test results are stored in a data storage and associated with the tested powder lot.

Figure 3:
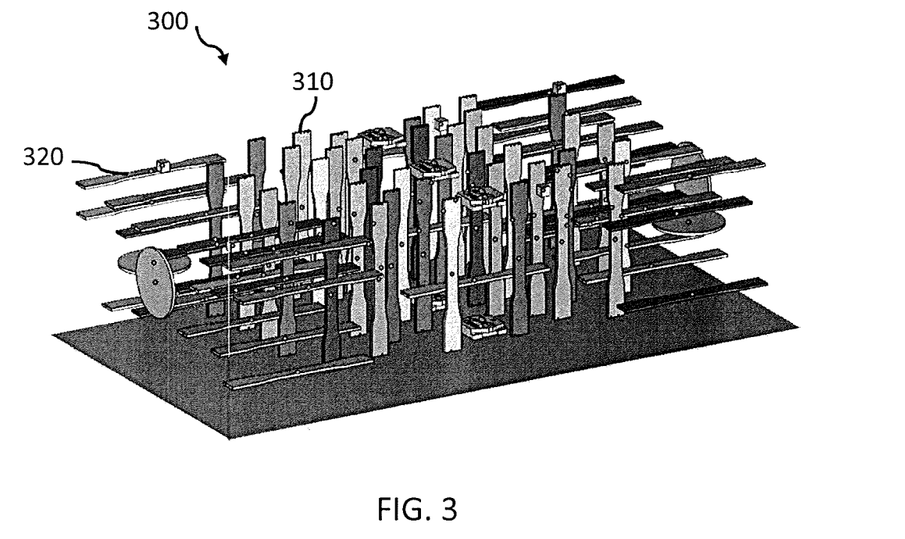
FIG. 3 illustrates a qualification build layout for manufacturing a plurality of parts using SLS.

After the powder is prepared, it may be used to print articles by selective laser sintering. The operator may first perform a qualification build 208 for a specific lot of powder in which the operator qualifies the prepared powder lot in a selective laser sintering machine for subsequent production builds. As illustrated in FIG. 3, a plurality of test bars 310, 320 are printed during the qualification build. The test bars extend in both the xy-direction and the z-direction. It should be understood to a person of skill in the art that the test bars can be formed in any orientation. Different parameters may be used to print each of the bars or different subsets of bars in the plurality of bars. For example, in one embodiment, different laser powers may be used to build different subsets of the plurality of test bars during the qualification build.

After completion, the test bars are subjected to material testing and inspection 209. Based on these test results, the operator can determine the optimal build parameters for the subsequent production build(s) and also qualify the prepared powder lot for use in production builds. The tests may include tensile testing pursuant to ASTM D638.

Figure 4:
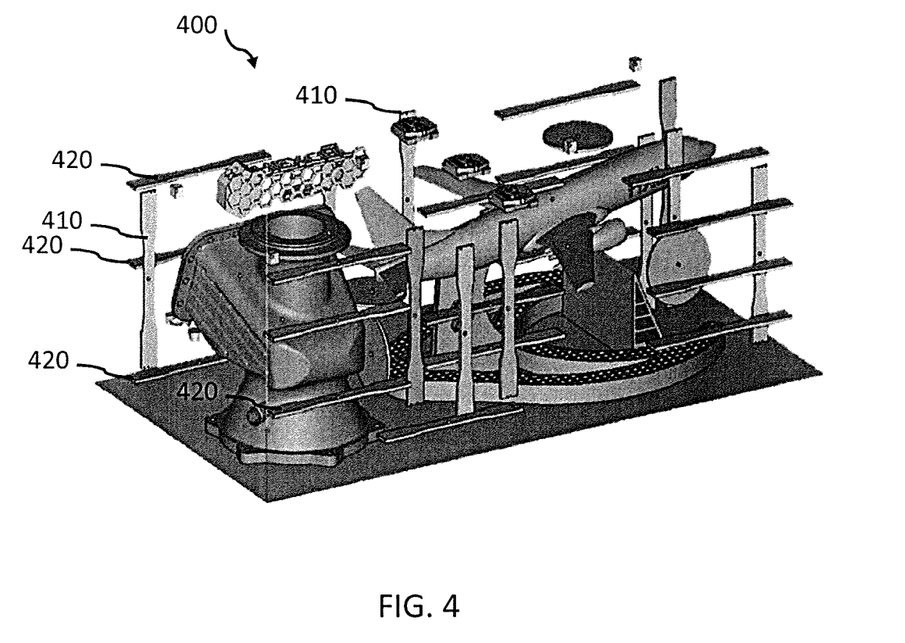
FIG. 4 illustrates a production build layout for manufacturing a plurality of parts using SLS.

Next, a production build may commence 210 using the prepared powder lot. The production build is illustrated in FIG. 4. The production build includes production parts, but also includes a plurality of test bars 410, 420 for performing testing. After the production different tests 211 may be performed on the test bars 410, 420 including tensile testing in both the z-direction and the xy-direction. In addition, the test bars are subject to visual inspections 213. Test results and inspection results are associated with the build and powder lot and stored in a data storage.

Figure 1:
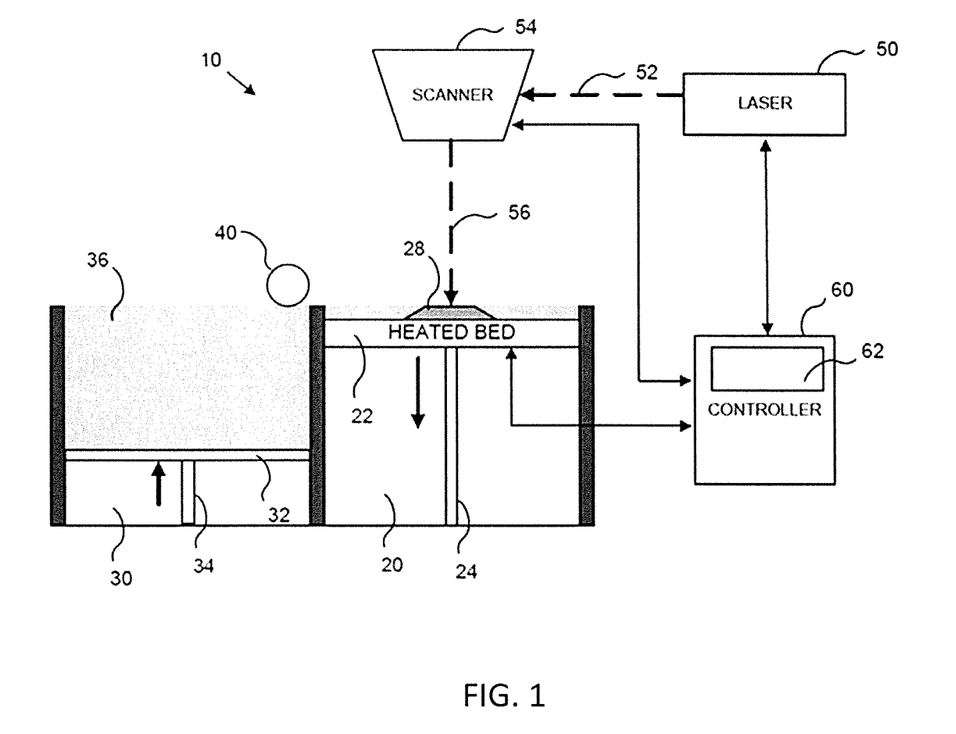
FIG. 1 illustrates a SLS machine in accordance with one embodiment of the present invention.

A system for selective laser sintering according to one embodiment of the present invention is shown in FIG. 1. The system 10 includes a first chamber 20 having an actuatable piston 24 deposed therein. A bed 22 is deposed at an end of the piston 24. It should be understood that the term bed may refer to the physical structure supported on the piston or the uppermost layer of powder deposed thereon.

The temperature of the bed 22 can be variably controlled via a controller 60 in communication with heating elements (not shown) in or around the bed 22. Furthermore, the SLS system 10 according to the invention may include a heating device (not shown) above the bed 22, which preheats a newly applied powder layer up to a working temperature below a temperature at which the solidification of the powder material occurs. The heating device may be a radiative heating device (e.g., one or more radiant heaters) which can introduce heat energy into the newly applied powder layer in a large area by emitting electromagnetic radiation.

A second chamber 30 is adjacent to the first chamber 20. The second chamber 30 includes a table surface 32 disposed on an end of a piston 34 deposed therein. A powder 36 for use in the LS system 10 is stored in the second chamber 30 prior to the sintering step. It will be understood to a person of ordinary skill in the art and familiar with this disclosure that while a specific embodiment of a LS system is disclosed, the present invention is not limited thereto, and different known SLS systems may be employed in the practice of the present invention.

During operation of the SLS system 10, a spreader 40 translates across a top surface of the first chamber 20, evenly distributing a layer of powder 36 across onto either the top surface of the bed 22 or the material previously deposed on the bed 22. The SLS system 10 preheats the powder material 36 deposed on the bed 22 to a temperature proximate to a melting point of the powder. Typically, a layer of powder is spread to have a thickness of 125 μm, however the thickness of the layer of powder can be increased or decreased depending on the specific SLS process and within the limits of the LS system.

A laser 50 and a scanning device 54 are deposed above the bed 22. The laser 50 transmits a beam 52 to the scanner 54, which then distributes a laser beam 56 across the layer of powder 36 deposed on the bed 22 in accordance with build data. The laser selectively fuses powder material by scanning cross-sections generated from a three-dimensional digital description of the part on the surface of the bed having a layer of the powder material deposed thereon. The laser 50 and the scanner 54 are in communication with the controller 60. After a cross-section is scanned, the bed 22 is lowered by one layer thickness (illustrated by the downward arrow), a new layer of powdered material is deposed on the bed 22 via the spreader 40, and the bed 22 is rescanned by the laser. This process is repeated until a build 28 is completed. During this process, the piston 34 in the second chamber is incrementally raised (illustrated by the upward arrow) to ensure that there is a sufficient supply of powder 36.

Further referring to powder qualification step 208 shown in FIG. 2 and FIG. 3, a method for performing qualification is described in US Publication No. US20180200960 published on Jul. 19, 2018 by Hexcel Corporation and titled "Method for Analytically Determining Laser Power for Laser Sintering." The disclosure of that reference is hereby incorporated by reference.

In reference to FIG. 3, in the qualification build, the SLS machine prints a plurality of identically shaped test bars 310, 320 from the chosen batch of powder material. Although the term test rods is used, the test parts are commonly referred to by other names including, but not limited to, test bars, test coupons, and dog bone samples. Each of the test bars is sintered by a specified laser power setting. For example, in one embodiment, ten different laser powers are used to manufacture ten test rods. In this manner, an operator can inspect and test the resultant rods to determine the laser power to use with the associated powder in subsequent production runs. It should be understood to a person of ordinary skill in the art and familiar with this disclosure that the number of rods may vary. Likewise, the number of rods printed using a specified laser power may vary. For example, in one qualification build, the build may include eight subsets of test bars extending in the z-direction and eight subsets of test bars extending in the xy-direction. Each of the subsets is printed using a different laser power, typically at increasing half watt intervals. Each of the subsets of the test bars may include one or more test bars. It is typical that each subset includes between three and five test bars, thereby providing additional qualification data for ensuring selection of the proper build parameters for subsequent production builds. It is not uncommon for a qualification build to include between 16 and 80 test bars.

After the qualification build is complete, each test bar is subjected to material testing and inspection. Each test rod is removed from the powder cake and then inspected (e.g., visually, using tomography, or other computer-based imaging) for voids or other defects in the surface(s) of the test rod. Voids and/or other defects in the test rod indicate a potential issue with the specific laser power used to construct the respective test rod. This step may further comprise inspecting a fracture point of each test rod formed during an ASTM D638 test process. In addition, the porosity of each test rod may be inspected (e.g., visually, using tomography, or other computer-based imaging). For example, optical coherence tomography (OCT) or other computer-based imaging may be used to determine porosity of each test rod. The system shown in FIG. 1 may comprise an OCT sensor or scanner that provides in-situ, real-time subsurface visualization of the test rods as they are built. In some embodiments of the present invention, precision instruments are used to measure any voids identified during inspection.

In some embodiments testing step may also take into account the inspection of each test rod's mechanical properties and tensile behavior during an ASTM D638 testing process. For example, such inspection analysis may comprise monitoring the manner in which the test rod fractures or breaks, where the fracture occurs, and the presence of banding or bowing. The method may further include the step of analyzing other factors affecting the laser sintering and the lifecycle of the built test rod.

In addition to inspecting each test rod for voids, the method according to the present teachings may include the additional step of measuring the tensile strength of each test rod and comparing the tensile strength results to determine strength of each test rod. In particular, each test rod is subjected to the ASTM D638 test procedure. ASTM D638 is a common plastic strength specifications and covers the tensile properties of unreinforced and reinforced plastics. This test method uses standard "dumbbell" or "dogbone" shaped specimens. A universal testing machine (tensile testing machine) performs the test. The testing machine obtains information about the tested part, including the tensile strength. The higher the yield strength, the more preferable the test rod. In addition to tensile testing, at least some of the specimens are subject to testing to determine the glass transition temperature, the composition, the resistivity, and the specific gravity.

After the test are performed, the test specimens with the desired mechanical properties are selected to determine the preferred laser power during construction builds. For example, a rod exhibiting the absence of voids in its surface has better mechanical properties than a rod having voids. In addition to the results of inspection or alternatively, high tensile strength balanced with other factors (e.g., porosity) may be used for determining which rod among the plurality of test rods possess acceptable/desirable mechanical properties. In some embodiments, this step includes analyzing the measurements of Z strength or the break point (psi) along the z-axis for each test rod. It is known that Z strength reflects the strength of the internal bond between the layers of an additive manufactured part and is an important characteristic in additive manufacturing. Based on evaluation of the tensile strength test results, one or more rods at a particular laser power may be identified as exhibiting higher "Z strength".

In other embodiments, the evaluation of tensile strength may also include an analysis of the elastic modulus or Young's modulus (psi) of each test rod, as well as the elongation to break/fracture (%) of each test rod. Other factors that may be monitored and evaluated are elongation at yield, nominal strain at break (grip separation), secant modulus of elasticity, and/or Poisson's Ratio.

In accordance with the present teachings, a plurality or rods manufactured at different laser powers from a single lot of powder or during a single build are inspected for void formation and/or tested using the ASTM D638. The test rod with the most desirable qualities is for example the rod having no formation of voids in the x-axis and a high Z strength.

Thereafter, the laser power associated with the selected rod is then used for subsequent production builds made from the same batch/lot of powder. That is, the SLS machine may be configured to use the optimal/preferable laser power when building an object(s) with powder from the chosen batch. In some embodiments, the optimal/preferable laser power and corresponding batch/lot number may be saved in a database or memory storage unit within the controller 62 so that the SLS machine can be configured at a later time when future construction of an object using the chosen batch of powder material is required.

After the qualification build is performed and the preferred build parameters are selected for a specific lot of powder, production builds can commence. In FIG. 4, a build volume for a production build is shown in which production parts are shown in the build volume. The production parts are depicted for illustration purposes and include a three dimensional model of a jet air plane and a section of ducting. Interspersed among the production items are test bars extending in the xy-axis 420 and the z-axis 410. In addition, the test build includes circular plates for testing resistivity. As a matter of protocol and good manufacturing procedures, it is customary to perform material testing on test parts made in the same build volume as production parts in a production build during selective laser sintering. Some customers require material testing of test bars manufactured in the same production build as product parts. In this manner, the builder can confirm that the production parts meet or exceed the specified material criteria based on the test results and analysis performed on test bars printed during the same SLS build.

A problem in the management of the data associated with the qualification builds and the production builds and more specifically the test bars is that it is difficult to accurately maintain the identification of each bar used in the test build. Maintaining an accurate identification of each test bar is of paramount importance because the identification is used to associate the test bar with a specific location and direction in the test build. In some cases, the identification may be used to associate the test bar with a powder lot. Precise management of these identifies is essential efficient management of the qualification and the production builds in SLS. If the identification information is corrupted, for example by an operator knowingly confusing the identification of test bars in a SLS build, the entire build must be abandoned. This results in loss of time, product, and money. If the identification information is unknowingly corrupted, for example by an operator unknowingly confusion the identification of test bars, it could result incorrect test data being relied upon in either qualification or production builds. In some circumstances, in could result even result otherwise qualified parts being rejected based on incorrect test data. Or, in the alternative, it could potentially result otherwise defective or poor quality parts being approved for sale to customers.

In order to ensure appropriate identification of test bars manufactured during an SLS build numeric numbers are printed on a planar surface of a grip area of the test bar. In reference to FIG. 5, two test bars 500, 550 are shown. The first grip section 510, 560 of each test bar 500, 550 includes a numerical digit 520, 570 on a face thereof. In the embodiment shown in FIG. 5, the numerical digit is recessed in a surface of the grip section 510, 560. The recessed digit is formed during the printing process. Each test bar is provided with a build design having a unique numerical digit or combination thereof in a grip section thereof. The test bar is constructed with the unique numerical digit recessed in the surface during the test build. After the build, the unique numerical identifier is used to positively identify each test bar in the build. In other embodiments, the numerical digits are printed on the surface of the grip section of the tensile bar by using a relief pattern in the relatively planar surface of the grip section. In this manner, the numerical digit may be considered an embossing in the surface of the grip section. The numerical digit is printed during the SLS process.

A disadvantage of the using numerical digits in the grip section of the test bar, whether they are recessed or embossed, is that they interfere with tensile testing performed on the test bars. It has been found that the recessed numbers and embossed numbers create significant stress concentrations in the grip section, particularly as the test bar is subjected to significant tensile load during the ASTM D638 tensile test. Under that test protocol, the bar is required to break in the section between the opposing grip sections of the bar. The numerical digits in the grip section and resultant high stress concentrations have resulted in the test bars failing at the grip sections. A failure at this location results in an inconclusive test and does not provide any data that can be used to support qualification or production. This can be particularly problematic when a specific number of test bars and subsequent material tests are required to approve a build. In some cases, the defective test bars result in having to redo a qualification or production build. Another disadvantage, particularly as it relates to the embossed numbers, is that they can interfere with the retention of the grip section in the test machine due to the uneven surface create by the embossed structure. This can lead to the additional problem that such bars are incapable of being used for testing.

In reference to FIG. 6, an embodiment is disclosed wherein a numerical identifier 620 is provided on a tab 618 that extends from the edge of the grip section 610 of test bar 600. In the design file for the build each test bar includes additional data for building the associated tab with a unique identifier. The identifier is then used to identify the test specimen in subsequent testing.

There are several disadvantages to using an identifier on a tab extending from the grip section of the tensile bar. First, the tab still may cause unwanted stress concentrations in the test bar while under load during tensile testing. These unwanted stress concentrations can result in failure of the bar in the grip section and the resultant problems discussed above. Another problem with the tab approach is that the tabs may break off from the test bar structure during handling or testing. This can result in misidentification of test bars. Even if it does not result in misidentification of test bars, it can result in test results or builds being voided in view of certain requirements all test specimens to have an identifier at all times during the test period.

The inventors have discovered a system that overcomes the problems associated using numerical identifiers in the grip section of the test bars or on tabbed sections of the test bars. Specifically, the inventors have disclosed system for identifying test bars formed in a selective laser sintering build. The system includes a part cake, such as those shown in the qualification build 310 shown in the FIG. 3 of the production build 410 shown in FIG. 4. The part cakes 310, 410 are formed during a selective laser sintering build. The part cake 300, 400 includes a plurality of parts formed from a powder by selective laser sintering and unsintered powder disposed around the formed parts. In reference to FIGS. 3 and 4, the unsintered powder is excluded to illustrate the representation of parts built in the cake bed. The plurality of parts include a plurality of test bars 310, 320, 410, 420. The test bars are for performing material testing.

ASTM D638 is performed by applying a tensile force to a test bar and measuring various properties of the specimen under stress. It is conducted on a universal testing machine (also called a tensile testing machine) at tensile rates ranging from 1 to 500 mm/min until the specimen fails (yields or breaks). Though ASTM D638 measures many different tensile properties, the following are the most common: Tensile strength—the amount of force that can be applied to a plastic before it yields (stretches irreparably) or breaks; Tensile modulus—how much a material can deform (stretch) in response to stress before it yields. Modulus is a measurement of the material's stiffness; elongation—the increase in gauge length after break divided by the original gauge length. Greater elongation indicates higher ductility; Poisson's Ratio—a measurement of the relationship between how far a material is stretched and how thin it gets during the stretching process.

Figure 7:
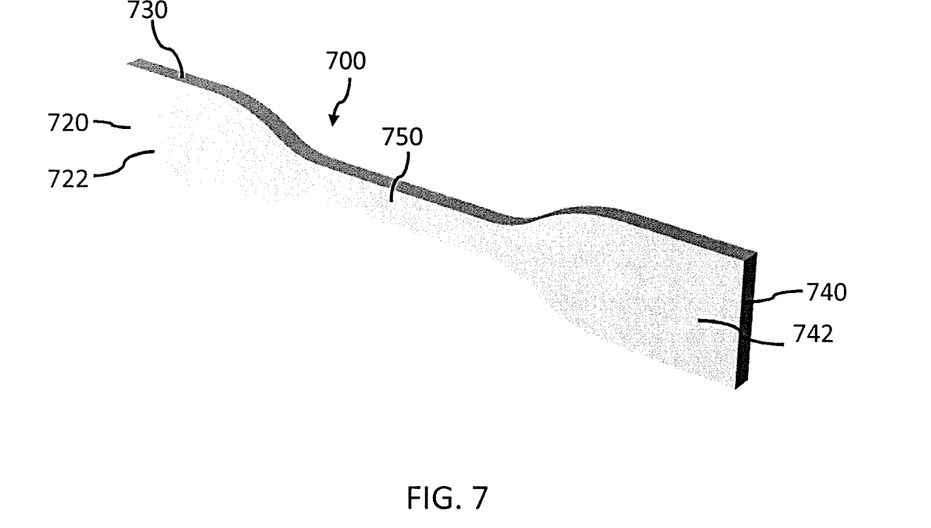
FIG. 7 is a perspective view of a test coupon.

In reference to FIG. 7, a test bar 700 specimen for performing the ASTM D638 tensile testing is shown. The bar 700 extends along an axis between a first end 720 and a second end 740. The bar has a first grip section 722 proximate to the first end 720 and a second grip section 742 proximate to the second end 740. The test bar defines a front surface extending in a plane between the first end 720 and the second end 740. The front face is generally planar. The test bar 700 includes a second a rear surface that extends in a plane between the first end 720 the second end 740. The second surface is generally planar and substantially parallel to the first surface. The test bar 700 includes a side surface 730 that extends between a periphery of the first surface and a periphery of the second surface. The test bar 700 has a gauge section 750 that extends along the axis and is between the first grip section 722 and the second grip section 742.

Figures 8A, 8B:
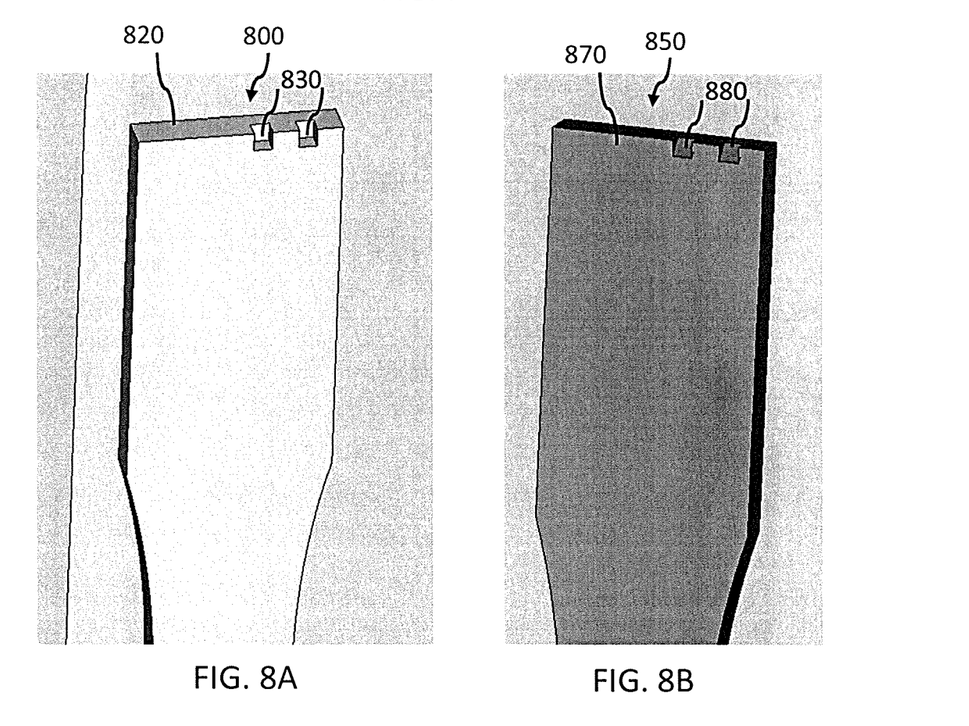
FIG. 8A is a perspective view of a portion of a test coupon.
FIG. 8B is a perspective view of a portion of a test coupon.
Figure 9:
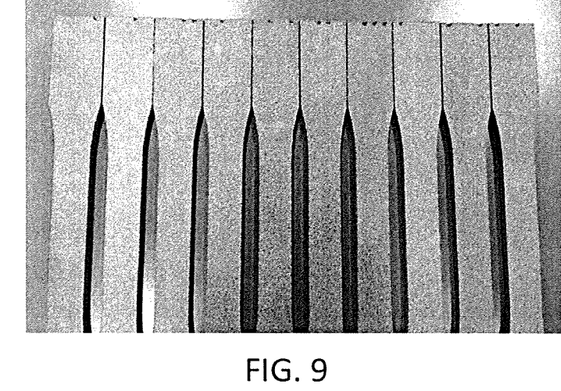
FIG. 9 is a view of a plurality of test coupons printed in accordance with the present invention.

In reference to FIGS. 8A and 8B, a test specimen 800 is shown in which a plurality of indentations 830 are provided in the first grip section 820. The plurality of indentations 830 are arranged in an information providing pattern that is adapted to be readable. In the embodiment disclosed the information providing pattern provides digital information. In this manner, it is possible to provide a unique physical identifier on the bar. In the embodiment shown in FIG. 8A, the plurality of indentations 830 are formed a notches in the side between the front surface and the rear surface at the first end of the test bar. By varying the pattern of notches and spaces, it is possible to use the notch system to uniquely identify 256 or more test specimens in a single SLS build. Information providing patterns in accordance with the present invention are provided below.

The inventors have discovered that by providing the information providing pattern on the test specimens in this manner, it is possible to uniquely identify the test specimens while also avoiding the problems associated with recessed or embossed numbers and the problems associated with using numerical numbers on tabs. It has been found that the indentations do not result in unwanted failure of the test specimens during tensile testing, thereby increasing efficiently and increasing product safety.

In reference to FIG. 8B, the test specimen 850 is shown in which a plurality of indentations 880 are provided in the first grip section 870. The plurality of indentations 880 are arranged in an information providing pattern that is adapted to be readable. The plurality of indentations, or notches, 880 are noticeably more shallow that the indentations provided in the test specimen 800 shown in FIG. 8A. In this manner, it is possible to provide two information providing patterns on a test specimen. For example, a first information providing pattern may comprise deeper notches and spaces as illustrated in FIG. 8A, while a second information providing pattern may comprise the more shallow notices and spaces as illustrated in FIG. 8B.

Figure 10:
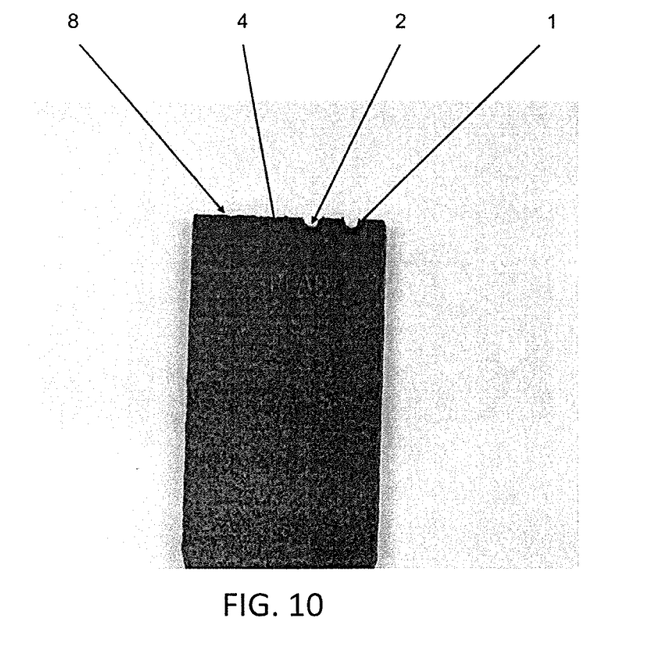
FIG. 10 is a perspective view of a portion of a test coupon showing an identification scheme in accordance with the present invention.

In reference to FIG. 10, a test bar with a digital information providing pattern is shown. The digital information pattern is in the form of a binary sequence that is read from right to left on the shown test bar. In the binary system used in this embodiment, there are four sequential positions on the distal edge of bar where a potential notch can be made. In the binary sequence, each position can either include an indentation or not include an indentation. As shown in the FIG. the first position is allocated a numerical value of one. The second position is allocated a numerical value of 2. The third position is allocated a numerical value of 4 and the fourth position is allocated a numerical value of 8. A unique identifier between 0 and 15 is provided by summing the value allocated to each position when a indentation is provided in that position. For example, in reference to FIG. 10, the first position and the second position each include a notch. While the third position and the fourth position do not include a notch. In this case, the bar has a unique identifier equal to 3 because 1 is allocated to the first position having the indention and 2 is allocated to the second position having the indentation. The third and fourth position do not include notches and therefore are not accorded any value. The sum of 1 and 2 is 3, thus the unique identifier from this information providing pattern is 3.

The binary sequence illustrated in FIG. 10 allows for a total of 16 unique identifiers. A person of ordinary skill in the art and familiar with this disclosure will understand that different binary sequences and codes may be used with the present invention and that the disclosure is not limited to the specific coding sequence employed in FIG. 10. For example, the test specimen may include fewer than four positions in the information providing pattern, or the test specimen may include greater than four positions in the information providing pattern.

In one embodiment of the present invention, the information providing pattern comprises a combination of spaces and indentations, wherein the indentations have a depth selected from a first depth, a second depth, and a third depth. In this manner, it is possible to increase the number of unique combinations that are available to represent test specimens in a powder cake.

In some embodiments of the present invention, each test bar in a powder cake includes a first information providing pattern and a second information providing pattern that is distinct from the first information providing pattern. For example, in one embodiment, the first information providing pattern is provided on an edge between the side and the first surface and the second information providing pattern is provided on the edge between the side and the second surface. In this manner, using the four position binary sequence described above, it is possible to provide 256 unique combinations. In some embodiments, the first information providing pattern uses deep notches while the second information providing pattern uses shallow notches. In this manner, an operator can readily distinguish between the first and second patterns by observation with the naked eye.

In some embodiments of the present invention, the first information providing pattern is provided on a first end of the test bar and the second digital information pattern is provided on a second end of the test bar. In yet other embodiments of the present invention, the information providing patterns are repeated on the first end and the second end.

In some embodiments of the present invention, the first information providing pattern may be used for an identifier that relates to laser power while the second information providing pattern relates to position of the bar in the powder cake. In another embodiment, the second information providing pattern may be used to identify a subset group in which the test specimen is allocated. A person of ordinary skill in the art and familiar with this disclosure will understand that the unique identifiers may be used to associate the test specimen with other factors not specifically described herein.

In some embodiments of the present invention, digital information patterns are provided in the first grip section and the second grip section. In this manner it possible to further expand the number of unique identifiers that are available in a powder cake. In other embodiments of the present invention, the digital information is provided on one of the first grip section and the second grip section. In yet further embodiments of the present invention, a first information providing pattern may be provided on the first grip section and then may be repeated on the second grip section. In this manner, it is possible to have the same unique identifier on the two parts of a test specimen after it is fractured during tensile testing.

In some embodiments of the present invention, the notches may be provided in the side of the grip section. In yet other embodiments of the present invention, the notches may be provided in both the sides and the end of the test bars. In yet other embodiments of the present invention, notches vary in shape. For example, on one embodiment some notches are circular, while other notches are triangular, while other notches are square. In this manner, it is possible to expand on the available information provided by the information pattern.

It will be understood to a person of ordinary skill in the art and familiar with this invention that the information providing patters may be used on different types of parts made in the build, including bars intended for different types of tests or for identifying parts made during the build process.

In some embodiments of the present invention, including those shown in the figures, the information providing pattern is readable by an unaided him eye. It should be understood by a person of skill in the art and familiar with this disclosure that in some embodiments the information may be provided such so that a magnifying device is required to observe the information providing pattern. In yet other embodiments, the information providing pattern is readable by a machine, such as an optical reader adapted to receive the rods and observe the digital information.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for identifying test bars formed during a selective laser sintering build, comprising:
    a part cake formed during a selective laser sintering build, the part cake comprising a plurality of parts formed from a powder by selective laser sintering and further comprising unsintered powder disposed around the formed parts,
    the plurality of parts comprising a plurality of test bars for performing material testing, each test bar of the plurality of test bars extends along an axis between a first end and a second end, each test bar of the plurality of test bars having a first grip section proximate to the first end and a second grip section proximate to the second end,
    each test bar of the plurality of test bars further comprises a plurality of indentations in one or more of the first grip section and the second grip section, the plurality of indentations being arranged in an information providing pattern that is adapted to be readable after the test part is removed from the part cake;
    wherein each indentation of the plurality of indentations comprises a notch in an edge of one or more of the first grip section and the second grip section.

2. The system of claim 1, wherein the information providing pattern on each test bar of the plurality of test bars provides a first identifier that is unique to the test bar on which the first identifier is arranged relative to the plurality of test bars.

3. The system of claim 2, wherein the information providing pattern comprises a binary sequence comprising one or more of an indentation and a space.

4. The system of claim 3, wherein the information providing pattern on each test bar of the plurality of test bars provides a second identifier that is distinct from the first identifier and that is unique to the test bar on which it is arranged relative to the plurality of test bars.

5. The system of claim 4, wherein the first identifier comprises notches having a first depth and wherein the second identifier comprises notches having a second depth, the second depth being different than the first depth.

6. The system of claim 1, wherein the edge is defined by an intersection between a first surface that extends in a plane parallel to the axis of the test bar and a sidewall that extends in a plane perpendicular to the plane in which the first surface extends.

7. The system of claim 6, wherein the edge is at one or more of the first end and the second end of the test bar.

8. The system of claim 7, wherein the edge is parallel to the axis of the test bar.

9. The system of claim 7, wherein the edge is perpendicular to the axis of the test bar.

10. The system of claim 1, wherein the position of the information providing pattern on the test bar does not interfere with material testing performed on the test bar.

11. The system of claim 10, wherein each of the plurality of test bars conforms with requirements defined by ASTM D638 for Standard Test Method for Tensile Properties of Plastics.

12. The system of claim 11, wherein the plurality of test bars comprises at least five test bars extending in a z direction in the part cake and at least five test bars extending in a plane perpendicular to the z direction.

13. The system if claim 12, wherein the indentations are readable by an unaided human eye.

14. A test bar formed in a selective laser sintering build, comprising: a
body extending along an axis from a first end to a second end;
a first grip section at the first end;
a second grip section at the second end;
a front surface extending in a plane between the first end and the second end; a rear surface extending in a plane between the first end the second end;
a side surface extending between the front surface and the rear surface;
a plurality of indentations in one or more of the first grip section and the second grip section, the plurality of indentations being arranged in an information providing pattern that is adapted to be readable;
wherein the indentations comprise notches formed in an edge of the one or more of the first grip section and the second grip section.

15. The test bar of claim 14, wherein each of the plurality of test bars conforms with requirements defined by ASTM D638 for Standard Test Method for Tensile Properties of Plastics.

16. The test bar of claim 15, wherein the information providing pattern comprises a binary sequence comprising one or more of an indentation and a space.

17. The test bar of claim 15, wherein the information providing pattern on each test bar provides a first identifier that is unique to the test bar on which it is arranged relative to a plurality of test bars formed during a laser sintering build in which the test bar was formed.

18. The test bar of claim 17, wherein the information providing pattern on each test bar provides a second identifier that is distinct than the first identifier and that is unique to the test bar on which it is arranged relative to the plurality of test bars formed during a laser sintering build in which the test bar was formed.

19. The test bar of claim 18, wherein the first identifier comprises notches having a first depth and wherein the second identifier comprises notches having a second depth, the second depth being different than the first depth.

20. The system if claim 19, wherein the indentations are readable by an unaided human eye.

21. The test bar of claim 14, wherein the edge is defined by an intersection between the side surface and one or more of the front surface and the rear surface.

22. The test bar of claim 21, wherein the edge is at one or more of the first end and the second end of the test bar and extends along an axis that is parallel to the axis of the test bar.

23. The test bar of claim 21, wherein the edge is at one or more of the first end and the second end of the test bar and extends along an axis that is perpendicular to the axis of the test bar.

24. The test bar of claim 23, wherein the position of the information providing pattern on the test bar does not interfere with material testing performed using the test bar.

25. A method for encoding a unique identifier on a test bar formed in a cake bed during a selective laser sintering build, the method comprising the steps of:
providing an identifier;
converting the identifier into a digital form;
building a test bar from a powder by selective laser sintering, the test bar comprising a body extending along an axis from a first end to a second end, a first grip section at the first end, a second grip section at the second end;
forming a plurality of indentations via the selective laser sintering in one or more of the first grip section and the second grip section, the plurality of indentations being arranged in a information providing pattern that is adapted to be readable.

26. The method of claim 25, wherein the step of building the test bar comprises building a test bar that conforms with requirements defined by ASTM D638 for Standard Test Method for Tensile Properties of Plastics.

27. The method of claim 26, wherein the information providing pattern comprises a binary sequence comprising one or more of an indentation and a space.

28. The method of claim 27, wherein the identifier is unique to the test bar on which it is arranged relative to a plurality of test bars formed during the same selective laser sintering build.

29. The method of claim 28, wherein the indentations comprise notches formed in an edge of the one or more of the first grip section and the second grip section.

30. The method of claim 29, further comprising the step of:
testing the test bar in accordance with ASTM D638 for Standard Test Method for Tensile Properties of Plastics.

31. The method of claim 30, wherein the position of the information providing pattern on the test bar does not interfere with material testing.

32. The method of claim 31, further comprising the step of: decoding the information providing pattern to determine the identifier; associating the identifier with a result of the testing in a storage.

* * * * *